United States Patent
Fantone et al.

(10) Patent No.: US 7,106,359 B2
(45) Date of Patent: Sep. 12, 2006

(54) SUBSURFACE VIDEO OBSERVATION SYSTEM

(76) Inventors: Stephen J. Fantone, 340 Summer St., Lynnfield, MA (US) 01940; Stephen D. Fantone, 340 Summer St., Lynnfield, MA (US) 01940

( * ) Notice: Subject to any disclaimer, the term of this patent is extended or adjusted under 35 U.S.C. 154(b) by 846 days.

(21) Appl. No.: 09/858,130

(22) Filed: May 15, 2001

(65) Prior Publication Data

US 2001/0048468 A1 Dec. 6, 2001

Related U.S. Application Data

(60) Provisional application No. 60/208,254, filed on May 31, 2000.

(51) Int. Cl.
*H04N 7/18* (2006.01)
*H04N 9/47* (2006.01)
(52) U.S. Cl. ...................................................... 348/81
(58) Field of Classification Search .................. 348/81, 348/143, 82, 83, 84, 85; H04N 9/47
See application file for complete search history.

(56) References Cited

U.S. PATENT DOCUMENTS

| | | | |
|---|---|---|---|
| 4,102,203 A * | 7/1978 | Sylvester et al. | 73/620 |
| 4,191,967 A | 3/1980 | Dansac et al. | |
| 4,764,334 A * | 8/1988 | King et al. | 376/248 |
| 4,777,501 A * | 10/1988 | Caimi et al. | 396/28 |
| 4,876,565 A * | 10/1989 | Tusting | 396/101 |
| 4,914,460 A * | 4/1990 | Caimi et al. | 396/28 |
| 5,005,213 A | 4/1991 | Hanson et al. | |
| 5,034,810 A * | 7/1991 | Keeler | 348/31 |
| 5,299,971 A | 4/1994 | Hart | |
| 5,305,030 A | 4/1994 | Yokoyama et al. | |
| 5,438,363 A * | 8/1995 | Ejima et al. | 348/223.1 |
| 6,097,424 A * | 8/2000 | Zernov et al. | 348/81 |
| 6,669,970 B1 * | 12/2003 | Ang et al. | 426/2 |

* cited by examiner

*Primary Examiner*—Nhon Diep
(74) *Attorney, Agent, or Firm*—Francis J. Caufield

(57) ABSTRACT

A video observation system, useful for location of fish and other plant and animal life underwater, comprises a solid state imager having substantial sensitivity to infrared radiation; video signal generating means for generating a video signal corresponding to the image formed on the solid state imager; mounting means for mounting the solid state imager on a submersible portion of a watercraft; and a video display device arranged to display a visible image corresponding to the image formed on the solid state imager.

18 Claims, 3 Drawing Sheets

SUBSURFACE VIDEO OBSERVATION SYSTEM

CROSS-REFERENCE TO RELATED APPLICATION

This application claims priority from U.S. Provisional Patent Application No. 60/208,254 which was filed and May 31, 2000 and whose contents in their entirety is incorporated herein by reference.

FIELD OF THE INVENTION

This invention relates generally to video observation systems, and more specifically to such systems having optical and mechanical arrangements configured to provide enhanced views of underwater inaccessible or inconveniently located objects such as fish, wild life, underwater structures and bottom and surface conditions.

BACKGROUND OF THE INVENTION AND PRIOR ART

Fishermen and marine engineers use a variety of devices to enhance their observations of subsurface phenomena. Fishermen often use polarizing sunglasses to eliminate surface reflections and thus enhance their ability to see subsurface objects. "Inverted" periscope devices (i.e., periscope devices which enable an observer above the water surface to view objects beneath the water surface, in contrast to conventional submarine periscopes which are designed to allow a submerged observer to see objects above water) are commercially available.

As fishing has become a more and more competitive activity over the years, fishermen have constantly sought to improve their results by using technology to detect the presence of fish and features of the aquatic environment. Thus, the use of sonar and related devices such as fish finders to provide information on subsurface objects, creatures and conditions is well established. However, such sonar-type devices tend to be relatively bulky and require substantial power supplies. Thus, they are not easily adapted for use on the small boats often used by fishermen on inland rivers and lakes. Furthermore, the images which sonar-type devices produce, being based upon acoustical properties of the environment rather than visual ones, are often not easy for inexperienced operators to interpret.

Accordingly, there is a continuing need for more effective devices for observing and detecting fish, other wildlife, objects and features of the environment beneath the surface of a lake, stream, river, estuary, ocean or other body of water. Desirably, such devices should be compact, have sufficiently low power requirements to permit operation by storage battery, and produce images based upon visual properties of the environment so that the images are easy for even inexperienced operators to interpret. It is a primary object of this invention to fulfil this need.

Fish and other underwater creatures are of course sensitive to light and indeed, since such creatures may often live in underwater environments where the light level is much lower than at the surface, fish and other creatures may be more sensitive to certain types of lights than are humans and other terrestrial creatures. Accordingly, it is desirable that devices used for underwater observation not require levels of illumination that are likely to scare away the fish or other creatures being sought, and it is a further object of this invention to provide devices which meet this need.

Yet another object of the invention is to control the spectral illumination of the scene and the sensitivity of the image detector to maximize the visibility of features of interest as displayed to the user.

Yet another object of the invention is to provide means to accommodate large variations of natural illumination of the area under observation and to provide supplementary illumination when required.

Yet another object of the invention is to provide video observation systems in a mechanical package having a streamlined profile in the water, this package being readily manipulable by an observer to provide views over a range of directions.

Yet another object of the invention is to provide video observation systems which can be packaged with means for propelling watercraft to which the video observation systems are to be attached. Preferred devices of the present invention using currently available video technology can readily be incorporated into existing trolling motor products with minimal modifications of such products.

Other objects of the invention will be apparent and will appear hereinafter in the following detailed description when read in connection with the drawings.

SUMMARY OF THE INVENTION

This invention provides a video observation system comprising:

a solid state imager having an operating mode wherein the solid state imager has substantial sensitivity to infrared radiation;

video signal generating means for generating a video signal corresponding to the image formed on the solid state imager;

mounting means for mounting the solid state imager on a watercraft so that the imager forms an image of an underwater area adjacent said watercraft; and a video display device arranged to receive the video signal and to display a visible image corresponding to the image formed on the solid state imager.

This invention also provides a watercraft having a solid state imager mounted thereon and arranged to image an underwater area adjacent the watercraft, video signal generating means for generating a video signal corresponding to the image formed on the solid state imager; and a video display device arranged to receive the video signal and to display a visible image corresponding to the image formed on the solid state imager. The solid state imager has an operating mode in which its has substantial sensitivity to infrared radiation.

In saying that the video observation system of the present invention has mounting means for mounting the solid state imager on a watercraft, I do not intend to restrict the invention to systems in which the solid state imager is mounted directly upon the hull or other fixed portion of the watercraft. As will appear from preferred embodiments of the invention described below with reference to the drawings, the solid state imager may be mounted upon an outboard motor or similar auxiliary device which is itself mounted on the hull or other fixed portion of the watercraft. Alternatively, the solid state imager might have the form of a towed unit which is mounted upon the watercraft via a cable, boom, or similar attachment means.

BRIEF DESCRIPTION OF THE DRAWINGS

The structure and operation of the video observation system of the present invention, together with other objects and advantages thereof, may best be understood by reading the detailed description in connection with the drawings in which unique reference numerals have been used throughout for each part and wherein.

DETAILED DESCRIPTION OF THE INVENTION

Figure 1:
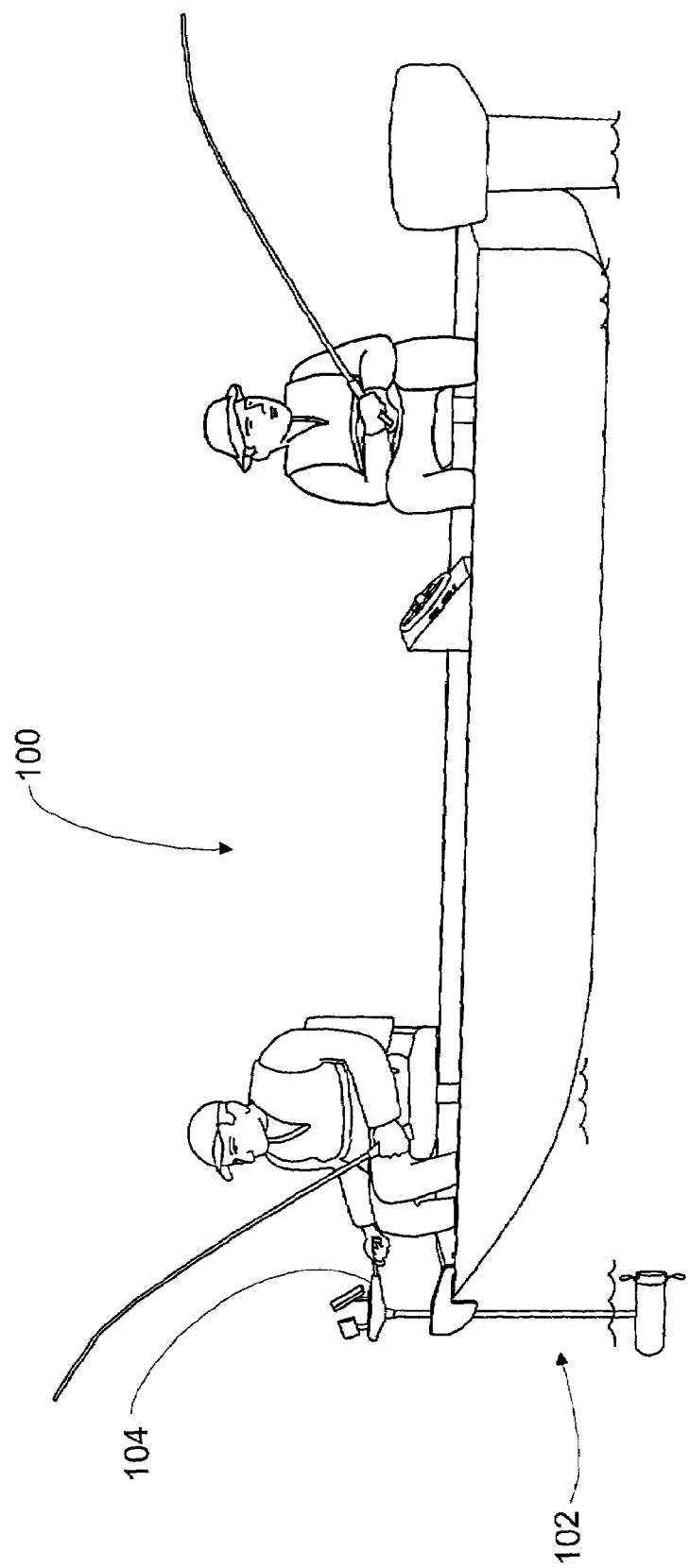
FIG. 1 is a side elevation of a watercraft equipped with a subsurface video observation system of the present invention integrated into a trolling motor.

The preferred form of solid state imager for use in the present invention is a charge coupled device (CCD), although other forms of solid state imagers, for example complementary metal oxide semiconductors (CMOS) devices may also be used. The following description will mostly assume that the solid state imager used is a CCD, since those skilled in the art of solid state imagers will have no difficulty in understanding any modification of the preferred embodiments needed to substitute CMOS or other types of solid state imagers for the CCD's described.

The present invention is based upon the realization that, because of the properties of the underwater environment and the radiation sensitivities of aquatic life forms, a low cost, low power consumption underwater observation system, which relies upon the optical rather than acoustic properties of the environment, requires sensitivity to infrared radiation, alone or (preferably) in combination with sensitivity to visible radiation. Sensitivity to infrared radiation extends underwater visibility by the reduction of Rayleigh scattering, the same effect which results in the "blueness" of the sky. In the case of the sky, the blue light is scattered strongly downwardly towards the earth's surface relative to the longer wavelength green and red light. Similarly, infrared light is less strongly scattered underwater than is visible light, so underwater visibility in the infrared region extends further than in the visible region (approximately 400–700 nm).

Over the last fifteen years or so, CCD cameras have developed from expensive laboratory devices to a preferred form of video sensor. It is well known to those skilled in the imaging art that the sensitivity versus wavelength curve of various types of imaging devices differs substantially from that of the human eye (for example, in the absence of sensitizing dyes, silver halide media are sensitive to near ultra-violet and blue light, but are essentially insensitive to red light). However, since both monochrome and color CCD video cameras are almost always sold with a "packaged" CCD arranged to have a sensitivity versus wavelength curve closely emulating that of the human eye, few people other than those skilled in the manufacture of CCD's realize that such devices have sensitivities extending from the ultra-violet through the near infrared (approximately 700–1000 nm) regions, and that their sensitivity actually peaks in the near infrared region, typically around 850 nm. The packaged CCD's normally sold are equipped with filters which essentially eliminate all radiation longer than about 700 nm. Other types of solid state imagers have similar sensitivities. The solid state imager of the invention preferably has an operating mode wherein it has substantial sensivity to infrared radiation in the range of about 700 to about 1400 nm.

Accordingly, the video observation system of the present invention has at least one operating mode in which the CCD is used without an infrared filter. This enables images to be obtained under low light conditions using both the visible and the high infrared sensitivity of the CCD. Furthermore, since fish and other aquatic creatures do not appear to be sensitive to near infrared radiation, the present video observation system may include a source of infrared radiation arranged to direct the radiation on to an area imaged by the CCD, since supplying such artificial infrared radiation will not scare away the fish or other creatures as might occur if artificial visible radiation were used.

As already indicated, the CCD or other imager used in the present invention may be monochrome or color. It will be apparent that when a color CCD and color video display device are used in the system of the present invention without an infrared filter present, the image on the display device is a false color image, in that the colors displayed do not correspond to the wavelengths of radiation which cause the CCD to generate its output. However, despite the false color in the image, such video images are much easier for untrained observers to interpret than are sonar (fish finder) images.

To enable the system of the present invention to operate in high light conditions, in which the response of an unfiltered CCD might become so large that the image would "white out", it may be desirable to arrange that the CCD have a first operating mode in which it is sensitive to both visible and infrared radiation, and a second operating mode in which it is sensitive to visible radiation only. Transition from one operating mode to the other can be achieved by mechanically moving an infrared filter in front of the CCD. Although in principle one could arrange for the present system to have an "infrared only" mode in which a visible light filter was placed over the CCD, so that the CCD would be sensitive to infrared radiation only, this is normally unnecessary.

The video signal generating means used in the present system are conventional components of any system using solid state imagers and can be used essentially without modification. As is well known to those skilled in the art of solid state imagers, such signal generating means scan the pixels of the solid state imager and produce a linear stream of signals, normally including horizontal and vertical timing signals, which can be used with any conventional video display device.

Although any conventional video display device, for example a cathode ray tube, or electroluminescent or electrophoretic display, may be used in the video observation system of the present invention, it is preferred that the display device be a liquid crystal display, since LC displays are readily available in various sizes and at reasonable costs, and have low power consumption.

FIG. 1 is a side elevation of a watercraft in the form of a fishing boat (generally designated 100) equipped with a video observation system of the present invention integrated into a trolling motor (the integrated system being generally designated 102). The trolling motor 102 is mounted on the bow of the watercraft 100 and can be manually turned relative to the bow through a limited arc by means of a handle 104. The video observation system is aligned with the trolling motor so that it displays an image preferably looking in the same direction as the trolling motor is pointing, but operates independently of the motor, i.e., the image can continue to be displayed even when the trolling motor is switched off. Alternatively, the display can be mounted in a slip ring assembly in which the display remains stationary with respect to an observer while the camera is pointed in different viewing directions.

Figure 2:
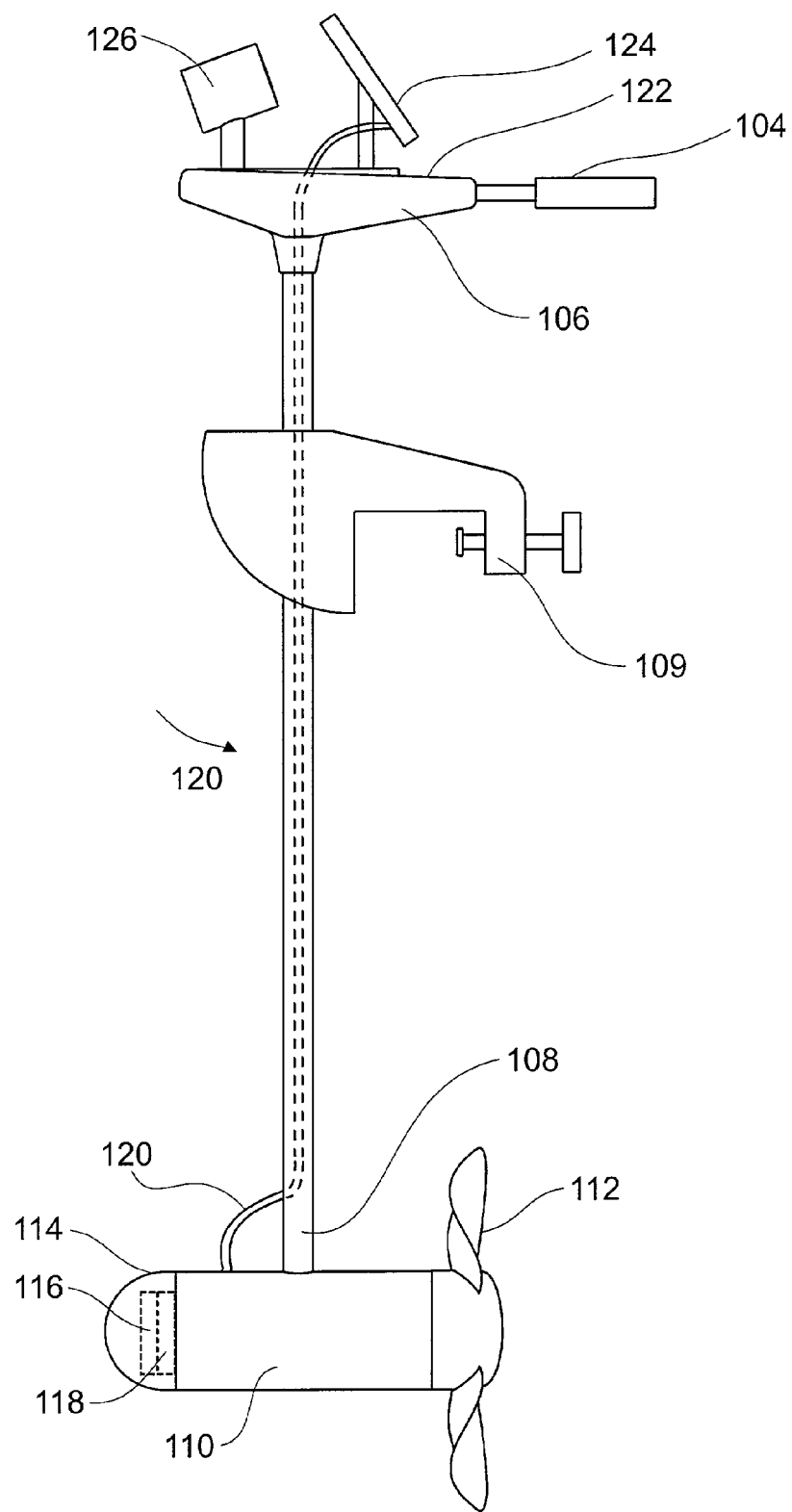
FIG. 2 is an enlarged side elevation of the integrated trolling motor/video observation system shown in FIG. 1.

As best seen in FIG. 2, apart from the incorporation of the various components of the video observation system, the trolling motor itself is of conventional design and comprises a combined battery pack/electric motor unit 106 to which the handle 104 is attached, this handle 104 being provided with a throttle (not shown) by means of which the trolling motor is controlled. Power to the moter itself is supplied via cabling (not shown) attached to a deep cycle storage battery. A shaft housing 108 descends vertically from the lower portion of the motor unit 106 and is provided with clamping means 109 (shown only schematically in FIG. 2) for clamping the trolling motor to the watercraft 100, while permitting substantial rotation of the motor relative to the watercraft by means of the handle 104. The lower end of the shaft housing 108 carries a cylindrical housing 110 having a horizontal axis and provided at one end with a motor/propeller drive unit 112. As will be apparent to those familiar with trolling motors, the electric motor within the motor/propeller drive unit 112 drives the propeller via a shaft disposed within the drive unit 112.

The end of the cylindrical housing 110 remote from the motor/propeller drive unit 112 is provided with a hemispherical transparent dome 114 which houses the solid state imager 116 and video signal generating means 118 (both these components are indicated only schematically in FIG. 2) of the present video observation system. Alternatively, the motor/drive unit 112 and the hemispherical transparent dome 114 may be swapped end to end if preferred. As already indicated, horizontal panning of the solid state imager 116 is effected by turning the trolling motor 102 by means of the handle 104, although of course if desired the solid state imager could be mounted, by means of a conventional mounting, to allow horizontal panning independent of the trolling motor 102. The solid state imager 116 may also be mounted for rotation about a horizontal axis within the cylindrical housing 110 to permit vertical panning of the imager 116. Depending upon the size of the field of view of the solid state imaging, in some applications, however, such as when the system is to be used in shallow lakes, streams and rivers, such vertical panning may be found unnecessary and a fixed, horizontally directed solid state imager 116 may be sufficient.

A waterproof cable 120 extends from the upper portion of the cylindrical housing 110 up along the shaft housing 108 to the flat upper surface 122 of the motor unit 106, where the cable is connected to a liquid crystal display 124. This display 124 is fixedly mounted upon the upper surface of the motor unit 106 substantially perpendicular to the axis of the cylindrical housing 110 so that the display is facing in the same direction as the solid state imager 116, i.e., so that the display shows an image taken in the same direction as that in which the angler normally views the display. (Alternatively, to facilitate viewing from anywhere in the watercraft 100, the display 124 could be swivel mounted on the surface 122 as mentioned earlier. However, in this case it would be highly desirable to provide some method of indicating the direction in which the image seen on the display is taken.) In practice, for ease of viewing, the display 124 is tilted slightly out the vertical, with its top edge further from the observer than its bottom edge. Desirably, the display 124 is surrounded, at least on its top and side edges with screens (not shown) in the form of opaque plates extending substantially perpendicular to the plane of the display; such screens render it easier to read the display in daylight and limit the amount of light scattered from the display in darkness, thus minimizing any chance of such scattered light disturbing fish or other aquatic creatures.

The cable 120 carries, at a minimum, power lines to supply the necessary power to the solid state imager 116 and the video signal generating means 118, and a video line supplying the video signal from the generating means 118 to the display 124. The cable may carry various other lines depending upon various optional components of the system; for example, the cable 120 may carry signal lines to control motors effecting horizontal or vertical panning of the imager 116, to control a zoom lens used to form the image on this imager, or to control movement of a filter relative to the imager 116 if the system is of the dual operating mode type previously discussed, having one mode where the imager is sensitive only to visible radiation and a second mode in which the imager is sensitive to both visible and infrared radiation.

The video observation system further comprises an infrared radiation source 126 mounted on the surface 122 on the opposed side of the display 124 from the viewed surface thereof; thus, the radiation source points in substantially the same direction as the solid state imager, but is directed downwardly below the horizontal so as to illuminate an underwater area including the field of view of the imager 116 (it will be seen that if the imager 116 is mounted for horizontal panning independent of the trolling motor 102, it may be necessary to provide some means for panning the radiation source 126 synchronously with the imager 116). Preferably the angle is chosen to optimize the depth of field of the camera system. The radiation source 126 is conveniently formed by covering a conventional incandescent lamp with a filter which blocks substantially all of the visible radiation. Indeed, since small watercraft are often equipped with incandescent lamps to facilitate their use at night, it may be possible to use a removable filter on the radiation source 126, thus permitting a single lamp to be used both as the radiation source of the video observation system and to assist navigation of the watercraft at night. The radiation source 126 may be switched on and off manually, or may be switched on automatically, using circuitry conventional in video cameras, when the video observation system determines that the light level is inadequate to permit proper imaging of the area under observation.

Although the video observation system shown in FIG. 2 is shown as integral with the trolling motor 102 as produced by its manufacturer, it will be apparent that a similar system of the invention could be configured as an add-on kit to a conventional trolling motor. Such a kit need comprise only four sections, namely the housing 118 (together with the parts disposed therein), the cable 120, the display 124 and the radiation source 126—or possibly simply an infrared filter for use with a conventional lamp, as already noted. The housing 118 could be secured to the housing 110 of the conventional trolling motor in any convenient manner, for example by screws, adhesive or a ring or magnetic clamp, while the cable 120 could be secured to the shaft housing 108 of the conventional trolling motor by ties or adhesive tape. Finally, the display 124 and the radiation source 126 could be secured to the upper surface of the trolling motor by, for example, screws or magnetic clamps. Such an add-on kit could carry its own battery or could tap into the existing battery of the trolling motor; since most conventional trolling motors operate at about 12 V DC and imagers and displays operating at the same voltage are readily available, no special voltage control circuitry being necessary.

Figure 3:
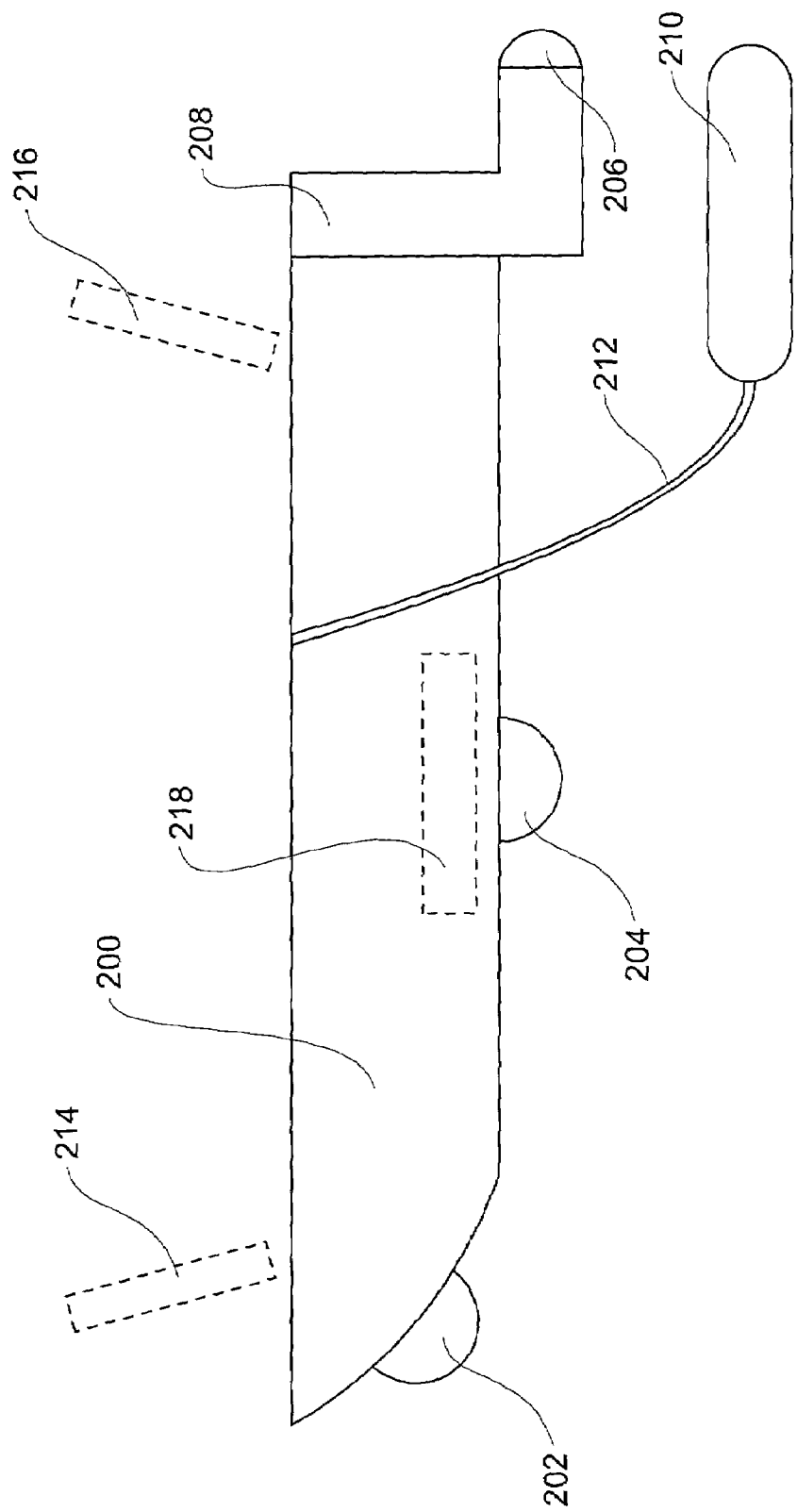
FIG. 3 is a side elevation, similar to that of FIG. 1, of a watercraft showing alternative locations for the various parts of a video observation system of the present invention.

FIG. 3 illustrates various possible locations for the solid state imager and video display device used in the present invention, which may be used as alternatives to the locations shown in FIG. 2. For purposes of illustration, FIG. 3 shows several possible locations of each component on the same watercraft 200, although normally only one imager and one display device would be provided on any small watercraft of the type illustrated.

FIG. 3 shows four possible locations for the imager; a substantially hemispherical housing 202 attached to the bow of the watercraft 200, a similar housing 204 attached to the keel, a similar housing 206 attached to the rudder 208, or a elongate towed housing 210 connected to the watercraft 200 by means of a cable 212. Of the four locations, the rudder-mounted housing 206 most closely resembles the trolling motor embodiment of the invention shown in FIG. 2 in that substantial horizontal panning of the imager can be achieved by manual turning of the rudder 208 (since such panning to find fish and other creatures is normally effected with the watercraft essentially dead in the water, the movement of the rudder 208 will have little or no effect on the movement of the watercraft 200) and the necessary electrical connections to the housing 206 can be made by means of a cable (not shown) running up the rudder 208 and into the watercraft 200.

Since the bow-mounted housing 202 is fixed relative to the hull of the watercraft 200, it will generally be desirable to provide the bow-mounted imager with horizontal panning capability. Similar considerations apply to the keel-mounted housing 204, which has the advantage of permitting 360° horizontal viewing, and even views looking downwardly directly beneath the watercraft 200. Rotation of a single imager in the keel-mounted housing 204 could be effected by means of control signals sent along a cable (not shown). However, a simpler and less expensive system might use known electromagnetic coupling devices, which permit manual rotation of a control unit mounted in the bottom of the watercraft adjacent the housing 204 to cause rotation of an imager located within this housing, without requiring a shaft or other mechanical connection extending through the hull.

As an alternative to mechanically rotating a single imager, the keel-mounted housing 204 could be provided with multiple imagers pointing in different directions, with the image on the image display device being switched from one imager to another as desired. It is well within the level of skill in the imaging art to provide a single video signal generating means arranged to generate a video signal corresponding to any selected one of a plurality of solid state imagers connected to the video signal generating means, and to superimpose upon the output of a video display device a visual indication of which imager is selected at any given time.

The bow-mounted housing 202 could be used with a radiation source generally similar to the source 126 shown in FIG. 2 and mounted on the bow of the watercraft 200. Alternatively, in the cases of both the bow-mounted housing 202 and the keel-mounted housing 204, the radiation source could be mounted within the housing adjacent the imager with, of course, appropriate screening to ensure that radiation from the source does not enter in the imager either directly or via reflection from the surfaces of the housing.

Although it might at first appear that the imager within the bow-mounted housing 202 or the keel-mounted housing 204 could be connected to a video display unit within the watercraft 200 by a cable passing through the hull, in practice it is very desirable that the present video observation system be portable from one watercraft to another, and thus that it not require any permanent modification of the watercraft. Thus, the imager within the bow-mounted housing 202 or the keel-mounted housing 204 is preferably connected the video display within the watercraft 200 either by cables running around the hull, or by short range radio transmitter/receiver devices (for example, of the types used in wireless computer networks); the low power consumption of the components within the housing permits them to be powered by (for example) a rechargeable battery which could be recharged at the end of a day's fishing.

The housings 202, 204 and 206 are somewhat vulnerable to damage when, for example, the watercraft is being loaded on to, or removed from, a trailer. The housings may, if desired, be provided with protective cages, formed for example from metal grids, to reduce the possibility of such damage. However, preferably the housings are made readily detachable from the watercraft so that they can be removed prior to trailering or other situations where damage is likely. In certain cases (for example, fiberglass or plastic hulls) where achieving such ready detachment of the housings present problems, it may be desirable to permanently mount a mounting plate or base on the hull and then to attach the housing to this plate or base by a quick release mechanism, for example by providing rails on the housing which fit into grooves in the plate or base.

The towed housing 210 should, in practice, be provided with means for horizontal panning of its imager. This may either be achieved by mounting the imager rotatably within the housing 210 or by providing the housing with a rudder which enables housing 210 to turn relative to the watercraft 200, the rudder being controllable by control signals sent along the cable 212. The housing 210 also requires some means, for example a flux gate compass or gyrocompass, to indicate the direction in which its image is taken. The towed housing 210 does have the advantage that it can readily be recovered within the watercraft 200 when the video observation system is no longer required, and can thus be protected from damage during transport etc. of the watercraft 200.

FIG. 3 also shows three possible locations for the video display, namely:

(a) a bow-mounted display 214, which is similar to the display shown in FIG. 2 except that it is mounted on the bow of the watercraft 200 itself, rather than on a trolling motor attached to the bow;

(b) a stern-mounted display 216, which is especially convenient for use with the rudder-mounted housing 206; and (c) a "bottom-mounted" display 218, which is located in the bottom of the watercraft 200 and is especially convenient for use with the keel-mounted housing 204.

Although the display 218 may be less convenient for viewing than the displays 214 and 216, the display 218 does have the advantage that it eliminates the possibility of scattered light from the display entering the water surrounding the watercraft 200 and disturbing fish and other aquatic creatures.

It will readily be apparent to those skilled in the art that numerous changes and modifications can be made to the preferred embodiments of the invention described above without departing from the scope of the invention. Therefore, it is intended that the embodiments described herein be considered as illustrative and not be construed in a limiting sense.

From the foregoing, it will be seen that the present invention provides a subsurface video observation system which greatly assists anglers in their search for fish. This system enables fish to be observed under low light conditions, such as in locations under docks, or overhanging vegetation, or under floating vegetation. By providing the system with a source of infrared radiation, observations can be made at night without disturbing fish and other creatures by using visible light.

The use of the present video observation system is not, of course, confined to anglers; rather, the system may be used in any underwater activity where conventional observations using visible light are difficult or unsatisfactory. Thus, applications of the present system include inspections of docks, jetties, oil rigs, submerged portions of watercraft, submerged pipelines and marine archeology sites.

Other changes will occur to those skilled in the art given the teachings of the invention and all such changes are intended to be within the scope of the appended claims.

What is claimed is:

1. A subsurface video observation system comprising:
a single solid state imager having an operating mode wherein said single solid state imager has substantial sensitivity for forming images in response to receiving infrared radiation in the range of about 700 nm to about 1000 nm;
video signal generating means for generating a video signal corresponding to the image formed on said solid state imager;
mounting means for mounting the solid state imager on a watercraft so that the imager forms an image of an underwater area adjacent said watercraft; and
a video display device arranged to receive said video signal and to display a visible image corresponding to the image formed on said solid state imager.

2. A video observation system according to claim 1 wherein said single solid state imager is a charge coupled device.

3. A video observation system according to claim 1 wherein said single solid state imager has a first operating mode wherein it is sensitive to both visible and infrared radiation and a second operating mode in which it is sensitive to visible radiation only.

4. A video observation system according to claim 1 wherein said mounting means are arranged to mount said single solid state imager on the hull of said watercraft.

5. A video observation system according to claim 4 wherein a plurality of said single solid state imagers are provided to enable viewing through the entire angle of 360° horizontally surrounding said watercraft.

6. A video observation system according to claim 1 wherein said mounting means are arranged to mount said solid state imager on an outboard motor attachable to said watercraft.

7. A video observation system according to claim 1 wherein said video display device comprises a liquid crystal display device.

8. A video observation system according to claim 1 further comprising a source of infrared radiation arranged to direct infrared radiation on to an area imaged by said solid state imager.

9. A video observation system comprising:
a solid state imager having an operating mode wherein said solid state imager has substantial sensitivity for forming images in response to receiving infrared radiation within the range from about 700 nm to about 1000 nm;
video signal generating means for generating a video signal corresponding to the image formed on said solid state imager;
mounting means for mounting the solid state imager on the hull of a watercraft so that the imager forms an image of an underwater area adjacent said watercraft;
a video display device arranged to receive said video signal and to display a visible image corresponding to the image formed on said solid state imager; and
rotating means for rotating said solid state imager relative to the hull of said watercraft, said system further comprising indicator means for providing a visual indication of the direction in which said solid state imager is pointing.

10. A video observation system comprising:
a solid state imager having an operating mode wherein said solid state imager has substantial sensitivity for forming images in response to receiving infrared radiation from within the range from about 700 nm to about 1000 nm;
video signal generating means for generating a video signal corresponding to the image formed on said solid state imager;
a video display device arranged to receive said video signal and to display a visible image corresponding to the image formed on said solid state imager; and
mounting means for mounting said solid state imager and said video display device on an outboard motor attachable to a watercraft so that the imager forms an image of an underwater area adjacent said watercraft.

11. A video observation system according to claim 10 further comprising a source of infrared radiation mounted on said outboard motor so as to direct infrared radiation to an area imaged by said solid state imager.

12. A video observation system comprising:
a solid state imager having an operating mode wherein said solid state imager has substantial sensitivity for forming images in response to receiving infrared radiation;
video signal generating means for generating a video signal corresponding to the image formed on said solid state imager;
mounting means for mounting the solid state imager on an outboard trolling motor attachable to a watercraft and capable of being manually rotated relative to the hull of said watercraft so that the imager forms an image of an underwater area adjacent said watercraft; and
a video display device arranged to receive said video signal and to display a visible image corresponding to the image formed on said solid state imager.

13. A watercraft having a single solid state imager mounted thereon and arranged to image an underwater area adjacent said watercraft, video signal generating means for generating a video signal corresponding to the image formed on said single solid state imager; and a video display device arranged to receive said video signal and to display a visible image corresponding to the image formed on said single solid state imager, said said single solid state imager having an operating mode wherein said single solid state imager has substantial sensitivity for forming images in response to receiving infrared radiation in the range of about 700 to about 1000 nm.

14. A watercraft according to claim 13 wherein said solid state imager is a charge coupled device.

15. A watercraft according to claim 13 wherein said single solid state imager has a first operating mode wherein it is sensitive to both visible and infrared radiation and a second operating mode in which it is sensitive to visible radiation only.

16. A watercraft according to claim 13 wherein said single solid state imager is mounted on the hull of the watercraft.

17. A watercraft according to claim 13 wherein said single solid state imager is mounted on an outboard motor attached to the watercraft.

18. A watercraft according to claim 13 further comprising a source of infrared radiation arranged to direct infrared radiation on to an area imaged by the solid state imager.

* * * * *